United States Patent Office 3,514,506
Patented May 26, 1970

3,514,506
PROCESS FOR PREPARING PHOSPHITE ESTERS
Robert Lee Wright, Nitro, W. Va., assignor to Monsanto
Company, St. Louis, Mo., a corporation of Delaware
No Drawing. Filed Dec. 13, 1966, Ser. No. 601,354
Int. Cl. C07f 9/08, 9/12
U.S. Cl. 260—976                                         3 Claims

ABSTRACT OF THE DISCLOSURE

The disclosure is a process wherein phosphite esters are produced with greatly improved hydrolytic stability by blanketing the reactants, process, and product in an atmosphere of dry inert gas.

---

This invention relates to a new process wherein phosphite esters are produced with greatly improved hydrolytic stability.

Phosphite esters, such as trialkyl, triaralkyl, and triaryl phosphites are known stabilizers for polymers. The phosphite ester, tris(nonylphenyl)phosphite, is used primarily as a non-staining stabilizer for polymers. One major use of tris(nonylphenyl)phosphite is as a stabilizer for styrenebutadiene rubber. Phosphite esters are not stable in the presence of water. In addition, phosphite esters become discolored when hydrolyzed. These are undesirable properties for polymer additives. The hydrolytic instability of the phosphite esters limits their use in industry.

An object of this invention is to promote the progress of science and useful arts. A further object of this invention is to provide a phosphite ester with hydrolytic stability. A further object of this invention is to provide a color-free phosphite ester. Other objects will become apparent as the description of the invention proceeds.

The unstable properties of phosphite esters have been recognized as a problem for some time. J. A. Cannon's U.S. Pat. 3,240,751 (1966) and B. A. Hunter's U.S. Pat. 2,733,226 (1956) deal with this problem. I have discovered that when air, water, and oxygen are excluded from the reactants and process for producing phosphite esters by blanketing the reactants, process, and product in an atmosphere of a dry inert gas, a product having unexpected hydrolytic stability and reduced color properties is obtained.

Phosphite esters having the formula $$\begin{array}{c} R_1-X \\ R_2-X-P \\ R_3-X \end{array}$$

wherein X is oxygen or sulfur and $R_1$ and $R_2$ are like or unlike organic radicals, e.g., aromatic, aliphatic, alicyclic radicals, and $R_3$ is hydrogen or an organic radical, represent a preferred class of phosphite esters which are contemplated within the broad scope of this invention. For example, the aromatic radicals may be aryl radicals such as phenyl, tolyl, ethylphenyl, nonylphenyl, decylphenyl, octylphenyl, arylphenyl, 2,4-dibutylphenyl, 2-methyl-3-ethylphenyl, cymyl, xenyl, naphthyl, and the like or aralkyl radicals such as benzyl, phenylethyl, phenylpropyl, and the like. The aliphatic radicals may be alkyl radicals such as methyl, ethyl, isopropyl, butyl, isoamyl, hexyl, heptyl, 2-ethylhexyl, nonyl, isodecyl, dodecyl, and the like or alkenyl radicals such as allyl, propenyl, butenyl, pentenyl, and the like; or alkynyl radicals such as propynyl, butynyl, pentynyl, and the like. The alicyclic radicals may be cycloalkyl radicals such as cyclopentyl, cyclohexyl, cycloheptyl, or cycloalkenyl radicals such as cyclopentenyl, cyclohexenyl, cycloheptenyl, and the like.

The aforementioned radicals may also be substituted by one or more substituents. Typical examples of substituents are halogens; alkoxy groups such as methoxy, ethoxy, propoxy, butoxy, ethoxybutoxy; and hydroxy groups.

It is preferred that the X radical in the above formula be an oxygen atom and that the $R_1$, $R_2$, and $R_3$ radicals each be an aryl radical containing from 6 to 15 carbon atoms. Tris(nonylphenyl)phosphite is particularly preferred for the process of this invention.

Tris(nonylphenyl)phosphite is made by the solvent free reaction of nonylphenol with phosphorus trichloride. The equation for the reaction is

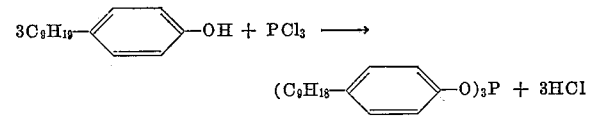

Analysis shows that about 89% of the nonylphenol starting material is the para isomer. A major factor in obtaining the high quality product of this invention is the elimination of water and air from the raw materials, from the reaction vessel, and from the finished product. The presence of moisture leads to hydrolytic instability of the product, and exposure to oxygen leads to both hydrolytic instability and color formation.

To prepare tris(nonylphenyl)phosphite by the process of my invention, 97.0 pounds of nonylphenol is charged into a clean, dry reactor previously purged with nitrogen. A slight flow of dry nitrogen over the surface of the liquid is maintained throughout the reaction. Heat is applied and the nonylphenol is agitated and heated to 100° C. whereupon 19.5 pounds of phosphorus trichloride is added slowly to the agitated nonylphenol while maintaining the reaction temperature at 100° to 110° C. The addition is made over a one to two hour period. Following the phosphorus trichloride feed, the temperature of the reaction is increased to 150° C.±5° C. and maintained there for 3 hours. After this, vacuum is applied gradually until 10 mm. Hg or less has been maintained for a 2 hour period while maintaining the temperature of the reaction at 150° C.±5° C. A small stream of nitrogen should be introduced below the surface of the product during the vacuum treatment to aid in purging the last traces of dissolved hydrogen chloride. Following the vacuum treatment, the vacuum is broken by admitting nitrogen into the system. The product is filtered to remove any foreign materials and then placed in a nitrogen-blanketed storage tank. The product is cooled to 70° C. prior to packaging. All steps of the process are blanketed with dry nitrogen to insure a minimum exposure to air. Nitrogen is the preferred gas useful in the practice of this invention. Examples of other inert gases useful in the practice of this invention are helium, neon, argon, krypton, and xenon.

The product of this process is a sparkling, clear liquid with an APHA color of 100 or less. The hydrolytic stability is in excess of 2,000 seconds as measured by the aqueous emulsion stability test. The APHA color test and the stability test are described, infra.

Hydrolysis times for tris(nonylphenyl)phosphite are determined by the aqueous emulsion stability test. A description of the test is as follows: Fifty grams of tris(nonylphenyl)phosphite is weighed into a 125 ml. Erlenmeyer flask. Twenty-five mls. of 0.01 normal potassium hydroxide is added to a 50 ml. beaker. The beaker and flask are placed in a water bath on a magnetic stirrer-hot plate, and the temperature control is set so that the temperature of the tris(nonylphenyl)phosphite and potassium hydroxide solution can be maintained at 150° F. A thermometer is used to check the temperature of the tris(nonylphenyl)phosphite sample and the potassium hydroxide solution. A magnetic stirring bar is placed in the flask containing the sample and the sample is stirred slowly, at about 300 r.p.m., while the material is coming to temperature. When the temperature of both the sample and the potassium hydroxide solution react 150° F., 0.5 ml. phenophthalein solution (saturated aqueous solution) is added to the potassium hydroxide solution, the potassium hydroxide solution is transferred to the stirring tris(nonylphenyl)phosphite sample and timing is started immediately. The temperature is controlled at 150° F. while obtaining the hydrolysis time. The time in seconds required for the disappearance of the indicator color represents the hydrolysis time.

The APHA color test is an American Public Health Association test described in the America Public Health Association's Standard Methods for the Examination of Water and Sewage, 13, 14 (8th ed., 4th printing 1939). Standard solutions of different measuring colors are prepared by adding distilled water to a solution of platinum-cobalt chloride solution which has a color rating of 500. The solution standards are in Nessler Tubes which are placed in a Nessler Color Tube Support. The Nessler Tubes and Support can be obtained from the Fisher Scientific Company. The color of tris(nonylphenyl)phosphite is determined by filling a Nessler Tube to a height equal to that in the standard tubes and then comparing the tris(nonylphenyl)phosphite with the standards. The comparison is made by looking vertically downward through the tubes upon a white or mirrored surface placed at such angle that light is reflected upward through the column of liquid. The tris(nonylphenyl)phosphite is assigned the color rating of the standard with the nearest matching color. The experiments in Table I illustrate the unexpected results obtained for hydrolysis times and APHA color tests with tris(nonylphenyl)phosphite prepared by the process of this invention compared to tris (nonylphenyl) phosphite prepared in other gas atmospheres.

Table I

| Gas flow above tris(nonylphenyl) phosphite reaction | Hydrolysis time, sec. | Color APHA units |
|---|---|---|
| 1 _____ Dry nitrogen _____ | 8,700 | 90 |
| 2 _____ do _____ | 7,380 | 90 |
| 3 _____ Wet nitrogen _____ | 312 | 100 |
| 4 _____ Dry oxygen _____ | 50 | (¹) |
| 5 _____ Cylinder air _____ | 20 | (¹) |
| 6 _____ Wet air _____ | 51 | (¹) |
| 7 _____ No gas flow, reaction carried out under atmospheric conditions. | 65 | 500 |

¹ Very dark, not within scale.

Experiments 1 through 6 are compared with experiment 7. Experiment 1, which utilizes the process of this invention, shows a 134-fold increase in hydrolysis time over experiment 7. The reaction of experiment 7 was carried out under atmospheric conditions. Experiment 2, which utilizes the process of this invention, shows a 114-fold increase in hydrolysis time over experiment 7. However, experiment 3, which does not utilize the process of this invention, shows a mere five fold increase in hydrolysis time over experiment 7. The color of experiments 1 and 2, which utilize the process of this invention, shows nearly a sixfold improvement over the color of experiment 7.

The hydrolysis times in Table II illustrate the improved properties of tris(nonylphenyl)phosphite prepared by the process of this invention compared to commercially available tris(nonylphenyl)phosphite.

TABLE II

| Tris(nonylphenyl)phosphite: | Hydrolysis time, seconds |
|---|---|
| Tris(nonylphenyl)phosphite of this invention | 8,700 |
| Tris(nonylphenyl)phosphite of this invention | 7,380 |
| Commercial sample A | 330 |
| Commercial sample B | 90 |
| Commercial sample C | 630 |
| Commercial sample D | 525 |

The tris(nonylphenyl)phosphite of this invention shows about a twelvefold improvement over the tris(nonylphenyl)phosphite of commercial samples C and D. The tris(nonylphenyl)phosphite of this invention shows a twenty-sixfold improvement over commercial sample A and a ninety-sixfold improvement over commercial sample B. Comparable results to those in Tables I and II are obtained when helium, neon, argon, krypton, or xenon are used as the inert gas of this invention for preparing phosphite esters.

It is intended to cover all changes and modifications of the examples of the invention herein chosen for purposes of disclosure which do not constitute departures from the spirit and scope of the invention.

I claim:
1. In a process for preparing phosphite esters wherein a phenol or alcohol is reacted with phosphorus trichloride in an inert atmosphere, the improvement which comprises:
    blanketing the reactants, process, and products with dry inert gas during reaction and then while continuously excluding air, water and oxygen, isolating the ester, removing the ester from the reactor and storing it under a blanket of dry inert gas.

2. In a process for preparing triaryl phosphite esters wherein a phenol is reacted with phosphorus trichloride in an inert atmosphere, the improvement which comprises.
    blanketing the phenol during reaction with dry nitrogen
    blanketing the processing steps for the phosphite ester product with dry nitrogen, and while continuously excluding air, water and oxygen, transferring it to a storage vessel, and
    storing the phosphite ester product in an atmosphere of dry nitrogen.

3. In a process for preparing tris(nonylphenyl)phosphite wherein nonylphenol is reacted with phosphorus trichloride in an inert atmosphere, the improvement which comprises:
    blanketing the nonylphenol during reaction with dry nitrogen,
    blanketing the processing steps for the tris(nonylphenyl)phosphite with dry nitrogen, and while continuously excluding air, water and oxygen, transferring it to a storage vessel, and
    storing the tris(nonylphenyl)phosphite product in an atmosphere of dry nitrogen.

References Cited

UNITED STATES PATENTS 3,244,661   4/1966   Kline _____ 260—29.7
3,330,847   7/1967   Cross.

CHARLES B. PARKER, Primary Examiner

R. L. RAYMOND, Assistant Examiner

U.S. Cl. X.R.
260—699, 967, 989